United States Patent [19]

Miles

[11] 4,006,603
[45] Feb. 8, 1977

[54] AIR CONDITIONING SYSTEM FOR A RAILWAY VEHICLE

[75] Inventor: Marshall Miles, Hollywood, Fla.
[73] Assignee: Vapor Corporation, Chicago, Ill.
[22] Filed: June 13, 1975
[21] Appl. No.: 586,496
[52] U.S. Cl. .................................. 62/229; 62/243; 104/148 R
[51] Int. Cl.² ........................................ F25B 27/00
[58] Field of Search ............ 62/229, 209, 228, 243; 318/227, 327; 105/49 R; 104/148 R; 165/43

[56] References Cited
UNITED STATES PATENTS

| | | | |
|---|---|---|---|
| 3,079,539 | 2/1963 | Guerth | 318/327 X |
| 3,584,279 | 6/1971 | Krauthamer et al. | 318/227 |
| 3,781,614 | 12/1973 | Mokryzki | 318/227 X |
| 3,783,360 | 1/1974 | Bundy | 318/327 |
| 3,795,117 | 3/1974 | Moody, Jr. et al. | 62/228 X |
| 3,803,863 | 4/1974 | Jednacz | 62/209 |
| 3,866,433 | 2/1975 | Krug | 62/229 |

Primary Examiner—William E. Wayner
Attorney, Agent, or Firm—Francis J. Lidd

[57] ABSTRACT

An air conditioning system for a railway vehicle operable from an applied high voltage direct current, which system includes an alternating current induction motor driving a variable speed, helical screw-type refrigerant compressor. A variable frequency AC drive circuit is provided to power the motor from the high voltage direct current. The output frequency of the drive circuit is varied according to the cooling demand of the vehicle.

4 Claims, 1 Drawing Figure

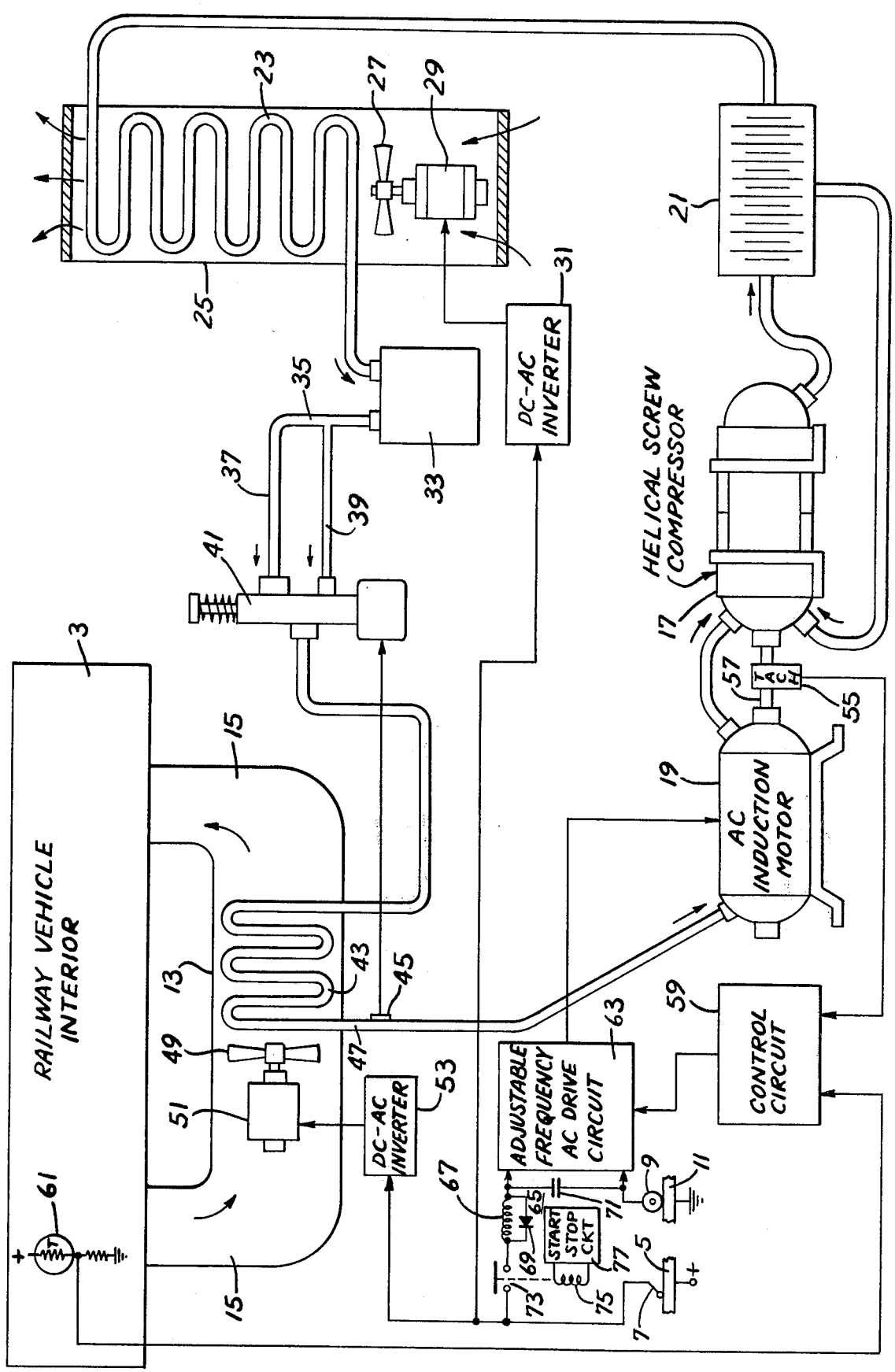

AIR CONDITIONING SYSTEM FOR A RAILWAY VEHICLE

BACKGROUND OF THE INVENTION

This invention relates to air conditioning systems, and more particularly to a compression type mechanical refrigeration air conditioning system for installation in a high voltage, direct current driven railway vehicle.

In recent years it has become almost universal practice to provide compression type mechanical refrigeration air conditioning systems in all types of passenger railway vehicles. Normally, reciprocating type compressors have been used in these air conditioning systems and they have been driven by a motor having an on-off control. Such on-off systems have not been satisfactory because the cooling system capacity cannot be varied in a manner such as to meet the widely varying cooling needs of the vehicle and passengers. Also, the cycling of compressors had been an inefficient manner of operation and subjects the valves and other components in its system to undue stress and unnecessary wear.

Another problem in such systems is the motor used to drive the compressor. Initially, direct current motors were used because, in the case of rapid transit and other electrically driven vehicles, the only practical power source for the compressors is the high voltage DC source used to power the vehicle, which may be picked up by means of a third rail or by means of an overhead wire and pantograph. This power source has not been entirely satisfactory because of the severe transients which are often developed as the vehicle passes over switches and open blocks where power may be temporarily interrupted. Furthermore, the power supply voltage, which typically measures in excess of 600 volts and may vary widely over different section of track, is difficult to regulate and presents special motor insulation and stability problems. Attempts at reducing the voltage applied to the DC motors by provision of series resistors between the power source and the motors have not only undesirably wasted power, but have also created additional cooling and ventilation problems for railway vehicle manufacturers.

Another problem with prior art DC compressor motors is that they require periodic brush replacement and frequent overhaul of commutator segments due to arcing across the segments. The high maintenance required of these motors makes their use in railway vehicles unnecessarily costly and detracts from the reliability of the vehicles, which often operate in environments where an operative air conditioning system is necessary for the vehicles to remain in service.

One potentially successful solution to this problem has been to use AC induction motors in the air conditioning system, in conjunction with an onboard means to convert the third rail direct current to alternating current. Induction motors because they have no commutator and brushes are substantially more reliable than DC motors. However, previous approaches to providing such onboard power converters have not been entirely satisfactory. For instance, one approach has been to provide a motor-alternator set on the railway vehicle to convert the third rail direct current to alternating current. Difficulties have been encountered due to the weight and complexity of motor-alternator sets which add unnecessarily to the vehicle's gross weight and hence increased cost of manufacture and operation of the vehicle. Further, motor-alternator sets themselves require periodic brush replacement and maintenance and therefore at lest achieve only a partial reduction in maintenance. Prior art attempts at providing static solid state, DC to AC inverters for this purpose have also been unsuccessful because the adverse electrical and physical environment in which such inverters must operate has heretofore prevented the degree of stability necessary for successful application to railway vehicles air conditioning systems.

An attempt has also been made to use in such an air conditioning system a helical screw type compressor driven by and AC induction motor. A DC to AC inverter supplied power to the motor and the compressor was operated continuously during the cooling mode of operation. An on-off thermostatic controlled refrigerant bypass valve was used to control temperature. Such a system, however, did not operate properly and was abandoned.

Accordingly, an object of the present invention is the provision of a new and improved compressor type, mechanical refrigeration system for a railway vehicle operable from a high voltage DC power line and providing continuous duty cooling at a rate dependent on the cooling demand of the vehicle interior.

Another object of the present invention is the provision of a compressor type, mechanical refrigerant air conditioning system for a vehicle utilizing an induction motor to drive a compressor at speed dependent on the cooling demand of the vehicle's interior.

SUMMARY OF THE INVENTION

Generally in accordance with the present invention a compressor type, mechanical refrigerant air conditioning system is provided for cooling the interior or a railway vehicle operable from an applied high voltage direct current. The system includes a helical screw refrigerant compressor driven by an induction motor and connected in a mechanical refrigerant system arranged to provide the cooling effect in the interior of the railway vehicle. A variable frequency drive circuit is provided for converting the applied high voltage DC to AC suitable for powering the induction motor, the frequency of the AC being varied in accordance with the cooling demand of space to be cooled whereby the cooling effort of the compressor is varied to regulate the temperature in the railway vehicle.

BRIEF DESCRIPTION OF THE DRAWING

The invention, together with the further objects and advantages thereof, can best be understood by reference to the following description taken in connection with the accompanying drawing in which the single FIGURE is a functional block diagram of an air conditioning system constructed in accordance with the invention.

DESCRIPTION OF THE PREFERRED EMBODIMENT

The air conditioning system shown in the drawing is preferably located in the ceiling of a railway vehicle 3 which is of conventional design and construction, being powered by means of a third rail positive DC power source 5 and power pickup shoe 7. The car operates on four trucks 9 which rest on a pair of rails 11, the latter serving as the ground return for the DC power source.

As shown in FIG. 1 the air conditioning system includes an evaporator assembly 13 located with a duct 15 which communicates with the interior of the railway vehicle 3, so as to remove dew from the interior and cool the same, while the air conditioning system is in operation. A helical screw type compressor 17 is provided to circulate the refrigerant of the system in a manner well known to the art, and an induction motor 19 is provided to drive the compressor. The output port of the compressor 17 is connected to the input port of an oil separator 21, separating the lubricating oil from the refrigerant and the separated oil is returned to the input port on the compressor 17.

The refrigerant is supplied to a plurality of condenser coils 23 in a condenser assembly 25. A fan 27 driven preferably by an induction motor 29 causes cooling ambient air to pass over the condensing coils 23 to remove heat from the refrigerant. The induction motor is powered by an DC-AC inverter 31, which may be of the conventional type, connected to the power lines 7 and 9.

The cooled refrigerant, having lost most of its thermal energy in the condenser coils 23 and now in a liquid state, is allowed to flow into a reservior tank 32 wherein a supply of refrigerant is maintained to compensate for temperature variations in the system. The refrigerant from the reservoir 33 is caused to flow into a manifold 35, which divides the flow between a refrigerant line 37 and a smaller diameter pressure line 39. The lines 37 and 39 are coupled together by a thermostatic expansion valve 41 which proportions the flow of refrigerant between the lines for the purpose of regulating the pressure within a plurality of evaporator coils 43 connected to the output of the valve 41. To this end a thermal bulb 45 is inserted within an outlet manifold 47 of the evaporator coils 43 to sense the temperature of the refrigerant gas and actuate the valve 41 to decrease the flow of refrigerant liquid through the pressure line 39 relative to the refrigerant line 37 when the refrigerant gas temperature is lower than desired, and to increase refrigerant flow through the pressure line 39 relative to the refrigerant line 37 when the refrigerant temperature is higher than desired.

The refrigerant from expansion valve 41 flows into the evaporator coils 43 disposed in the evaporator assembly 13 wherein it is allowed to return to a vapor state. In so doing, the refrigerant absorbs heat from the air from the interior of the car which is caused to flow through the duct 15 by means of a fan 49 driven preferably by an induction motor 51, thereby effectively cooling the interior of the car. The induction motor 51 is powered by a DC-AC inverter 53 which may be of the conventional type, having its input connected to the power lines 7 and 9.

As shown in FIG. 1, the refrigerant is returned through the induction motor 19, which may be a standard three phase hermetically sealed, squirrel cage induction motor. The refrigerant thus serves to maintain the operating temperature of the motor within safe limits, notwithstanding possible continuous operation and wide variations in ambient temperature. The refrigerant exiting from the motor 19 is applied to the inlet port of the compressor 17 wherein it is combined with the lubricating oil to begin the compression cycle anew.

A shaft speed sensor 55 such as a conventional tachometer, is positioned on the compressor drive shaft 57 and develops an electrical signal indicative of the rotational speed of the shaft. This speed signal is fed back to a control circuit 59 which may be a conventional comparison circuit, wherein the speed signal is compared with a control signal, indicative of the temperature of the car interior, from a thermostat 61, such as a conventional thermister temperature sensing circuit. The control circuit 59 develops a command signal for application to an adjustable frequency AC drive circuit 63. This command signal indicates whether more or less cooling is called for and therefore whether a change in the operating speed of the compressor drive motor 19 should be put into effect. Should a greater cooling effort be required the frequency of the alternating current developed in drive circuit 63 is increased thereby increasing the rotational speed of the compressor drive motor 19 connected to the output of the drive circuit and hence increasing the cooling effort of the compressor 17.

The drive circuit 63 may be of the conventional type, such as the Borg Warner Control Acculoc system or the Louis Allis Lancer 44XL system, described in Control Engineering, November 1971, Pages 57 to 70. Such drive circuits include a three phase solid state adjustable frequency inverter whose output is coupled to the induction motor 19 and a solid state DC to AC converter or chopper whose output is connected to the input of the inverter. The input of the converter is coupled to the power lines viz., the third rail 5 and the ground rail 11. The command signal from the control circuit 59 controls the operating frequency of the inverter in accordance with the cooling load and at the same time preferably adjusts the DC output voltage of the converter to provide the constant voltage/frequency ratio required by the particular induction motor for efficient operation.

A circuit which may be readily modified to serve as the AC drive circuit 63 is set forth in Patent No. 3,584,279. The patented circuit is modified so that the command signal from the control circuit 59 which is made a positive DC signal varying in accordance with the comparison between the signals from the thermostat 51 and the sensor 55, is substituted for the manually determined speed control signal.

Because transients are quite prevalent in the power lines for railway vehicles, a transient suppressor circuit 65 is provided in the input to the drive circuit 63. In the illustrated embodiment, the transient suppressor circuit 65 includes a parallel connected inductor 67 and reverse biased diode 69 connected in series between the positive line 7 and the positive input to the drive circuit 63 and a filter capacitor 71 connected across the input of the drive circuit. A normally open contact 73 of an on-off relay 75 is disposed in series with the positive input to the drive circuit 63, which relay 75 is actuated by a start stop citcuit 77 which may be of the conventional type containing manually operated start and stop push buttons.

While the major components of the air conditioning system may be separated, as by placing the compressor 17 and its motor 19 under the vehicle and the evaporator 13 on top of the vehicle, it is often preferable for reasons of manufacturing economy to construct and check out the entire system as one unit. Furthermore, when constructed as a single unit, the air conditioning system can be positioned either below the vehicle or, preferably, above the vehicle where a minimum amount of ductwork is required.

Thus, a novel air conditioning system has been disclosed which utilizes a light-weight, screw-type compressor in conjunction with a variable frequency drive circuit. This permits the compressor speed, and hence the cooling output of the system, to be continuously modulated in response to variations in the temperature of the vehicle. The system is ideally suited for operation in a rapid transit or similar type railway car. The system is compact and economical to construct, and may in a preferred embodiment be incorporated in a single unitary package to be incorporated into the railway vehicle during initial construction.

While a particular embodiment of the invention has been shown and described, it will be obvious to those skilled in the art that changes and modifications may be made without departing from the spirit and scope of the present invention. Various features of the invention are set forth in the appended claims.

What is claimed is:

1. In an air-conditioning system for a railway vehicle which is operable from power lines carrying high voltage direct current, a variable speed helical screw refrigeration compressor connected in the system so that the cooling output of the system is continuously modulated by changes in speed of the compressor, and an a-c induction motor connected to said helical screw refrigeration compressor for driving the same, said motor being capable of operating over a range of speeds, the operating speed within said range being determined by the frequency of the input signal to said motor, a solid state circuit means having its input adapted to be connected to the power lines and its output coupled to the input of the motor for converting said high voltage direct current to alternating current whose frequency varies over a range of frequencies, the operating frequency within the range being determined by a control signal applied to said circuit means, and temperature sensing means for sensing the temperature within the railway vehicle and for controlling the compressor speed as a function of variations in the temperature in the vehicle and providing a control signal to the circuit means which varies over a range of values, the value of the control signal within the range being determined by the cooling demand of said railway vehicle, whereby the helical screw compressor speed is continuously modulated in response to variations in the temperature of the vehicle.

2. Apparatus in accordance with claim 1 wherein the circuit means includes a chopper at its input for controlling the output voltage of the circuit means in accordance with the control signal and a three phase inverter connected to the chopper for controlling the frequency of the drive circuit in accordance with the control signal, and the induction motor is a three phase type.

3. Apparatus in accordance with claim 2 wherein a transient suppressor circuit is provided in the input to the drive circuit.

4. Apparatus in accordance with claim 3 wherein a shaft speed sensing means provides a feedback signal indicative of the speed of the shaft of the motor, a control circuit means is provided which compares the signal from the temperature sensing means with the feedback signal and provides the control signal to the circuit means.

* * * * *